United States Patent [19]
Case et al.

[11] Patent Number: 6,097,402
[45] Date of Patent: Aug. 1, 2000

[54] SYSTEM AND METHOD FOR PLACEMENT OF OPERANDS IN SYSTEM MEMORY

[75] Inventors: Colyn Case, Grass Valley; Brian K. Langendorf, El Dorado Hills; George R. Hayek, Cameron Park; Kim A. Meinerth, Granite Bay, all of Calif.

[73] Assignee: Intel Corporation, Santa Clara, Calif.

[21] Appl. No.: 09/021,192

[22] Filed: Feb. 10, 1998

[51] Int. Cl.[7] .................................................. G06F 15/167

[52] U.S. Cl. ........................ 345/512; 345/520; 345/521; 345/430; 711/173

[58] Field of Search ..................................... 345/520, 521, 345/512, 519, 507–509, 430, 515; 711/170–173

[56] References Cited

U.S. PATENT DOCUMENTS

| | | | |
|---|---|---|---|
| 5,909,559 | 6/1999 | So ........................................... | 710/127 |
| 5,911,051 | 6/1999 | Carson et al. ........................... | 710/107 |
| 5,920,881 | 7/1999 | Porterfield ................................. | 711/2 |
| 5,923,860 | 7/1999 | Olarig ...................................... | 710/129 |
| 5,930,827 | 7/1999 | Sturges .................................... | 711/170 |

OTHER PUBLICATIONS

Microprocessor Report, "AGP speeds 3D graphics" by Yong Yao, pp. 11–14, Jun. 17, 1996.
Electronic Engineering Times, "PCI–to–AGP move boots 3–D graphics" by R. Brummer, May 5, 1997.
Intel, MMX technology, application notes, "AGP and 3D Graphics Software" [Online], Copyright Intel Corp. 1996, [retrieved on 1999–02–10]Retrieved from the Internet:<URL:http://developer.intel.com//drg/mmx/App-Notes/agp.htm#3>.

*Primary Examiner*—Kee M. Tung
*Attorney, Agent, or Firm*—Blakely, Sokoloff, Taylor & Zafman LLP

[57] ABSTRACT

A method and system for enhancing graphics processing through selected placement of at least one graphics operand in main memory. The system includes a graphics controller in communication with system memory through a dedicated graphics bus such as an Accelerated Graphics Port (AGP) bus. This allows texture maps, alpha blending data and other graphics information to be contained in system memory without degradation of system performance.

21 Claims, 3 Drawing Sheets

SYSTEM AND METHOD FOR PLACEMENT OF OPERANDS IN SYSTEM MEMORY

BACKGROUND OF THE INVENTION

1. Field of the Invention

The present invention relates to the field of graphics. More particularly, the present invention relates to a system and method for enhancing graphics processing through selected placement of one or more graphics operands in system memory.

2. Art Related to the Invention

For a number of years, personal computers (PCs) have been implemented with a graphics subsystem that is responsible for rendering perspective display views of an object or collection of objects (scene) for display. Normally, a three-dimensional (3D) object is represented as polygons having bitmaps applied to their surfaces. These bitmaps are referred to as "texture maps" because they are used to give a sense of texture to the polygonal objects. By applying texture maps to various polygons within the object, reshaping the polygons and remapping the texture maps to the polygons as the perspective view of the viewer changes, it has become possible to render perspective views of the 3D object approximately in real-time.

Normally, the graphics subsystem includes a graphics controller coupled to both a local frame buffer memory and an input/output (I/O) bus such as a Peripheral Component Interconnect (PCI) bus. To maximize performance, the local frame buffer memory is sized to include operands which are loaded with data to support graphics operations. These graphics operands include a rendering buffer, a Z-buffer, a display buffer(s) and a texture buffer.

In support of these graphics operands, the local frame buffer memory may be implemented with a sufficient memory size to contain each and every texture map possibly used for a scene. However, the amount of memory required by the local frame buffer memory typically would be quite large and too costly to provide. Alternatively, if the texture buffer is implemented with a lesser amount of memory, it may be necessary to constantly reload portions of texture maps to render a 3D object. However, in accordance with conventional system designs having the graphics controller connected to the PCI bus, reloading portions of texture maps greatly reduces the speed of the PC in producing 3D objects for display.

Thus, it would be advantageous to provide a system and method which would allow operands to be placed in main memory without sacrificing system performance.

SUMMARY OF THE INVENTION

In one embodiment, the present invention pertains to an electronic system comprising a chipset, a graphics subsystem and a memory subsystem. In particular, the graphics subsystem is interconnected to the chipset through a dedicated graphics bus. The memory subsystem includes a memory element containing at least one graphics operand.

BRIEF DESCRIPTION OF THE DRAWINGS

The present invention is illustrated by way of example and should not be limited in scope to the accompanying drawings in which.

DETAILED DESCRIPTION OF THE PREFERRED EMBODIMENT

The present invention describes a system and method for relocating graphics operands used in the generation and display of three-dimensional (3D) objects. This may be accomplished by placing one or more graphics operands, normally featured in dedicated local memory of a graphics subsystem, into system memory. These graphics operands are accessible through a bus connected between the chipset and the graphics subsystem such as an Accelerated Graphics Port (AGP) bus described in "AGP and 3D Graphics Software" published on or around April 1997 by Intel Corporation of Santa Clara, Calif. As a result, a lesser amount of local memory would be needed. Also, the texture maps would not have to be continuously reloaded from system memory into local memory which reduces system performance.

Herein, various terms are used herein to describe certain architecture or characteristics of the present invention. For example, the term "graphics information" is broadly defined as data, and/or address, and/or control used to generate and display 3D objects. A "bus" is also broadly defined as any information-carrying medium (e.g., one or more electrical wires, bus traces, fiber optics, etc.). An "electronic system" is hardware capable of processing digital information such as a computer. A "subsystem" includes a single integrated circuit (IC) device or multiple IC devices performing an intended function. The IC device(s) may be placed within a single IC package or within a multi-chip IC package mounted on (i) a common substrate (e.g., daughter card, motherboard, etc.) or (ii) different substrates interconnected by a common substrate or a bus. A "chipset" is a collection of one or more ICs operating as a collective unit to route information.

Figure 1:
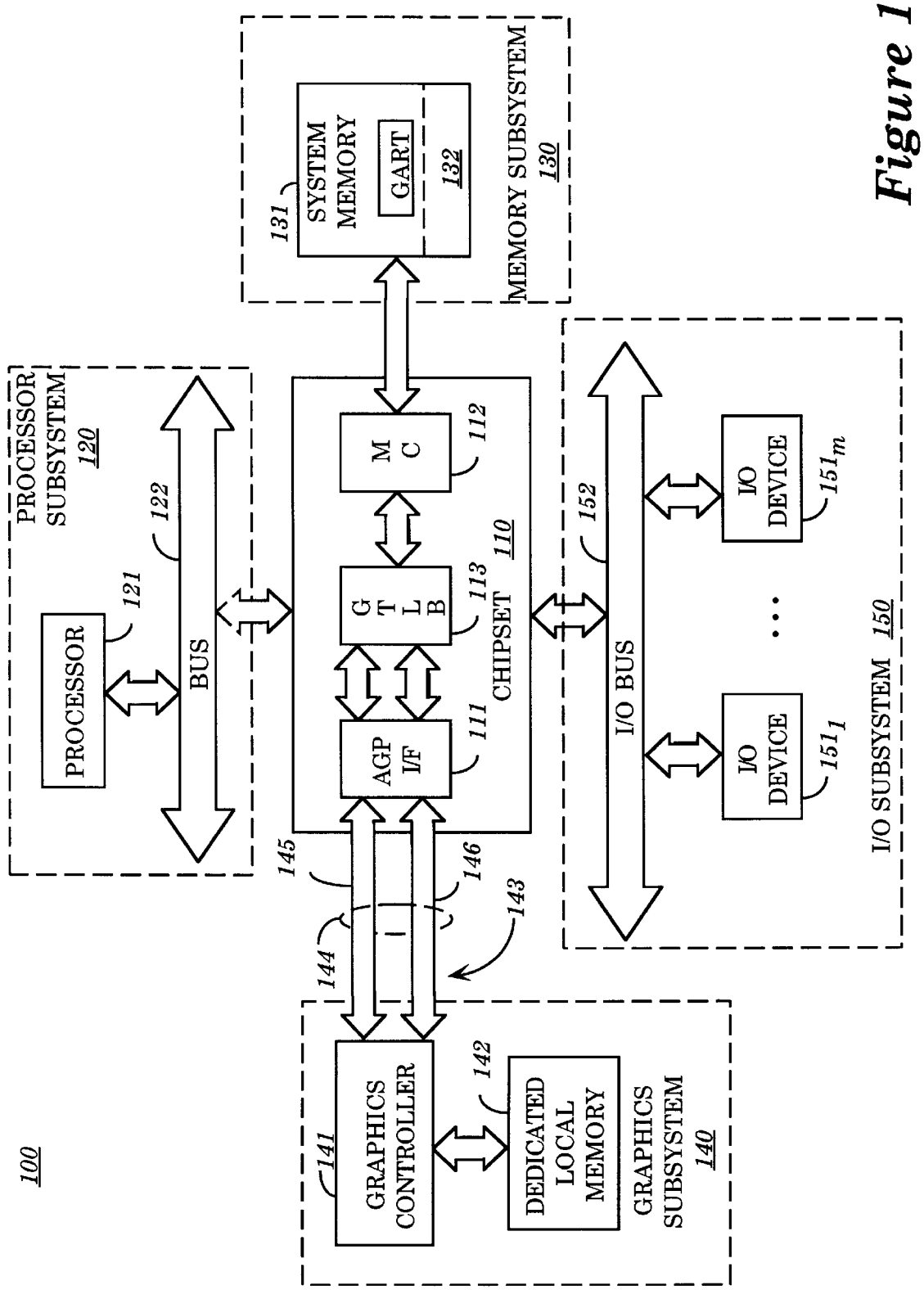
FIG. 1 is an illustrative embodiment of an electronic system featuring the present invention.

Referring now to FIG. 1, an illustrative embodiment of an electronic system 100 featuring the present invention is shown. The electronic system 100 includes a chipset 110 connected to a processor subsystem 120, a memory subsystem 130, a graphics subsystem 140, and an input/output (I/O) subsystem 150. At any time, electronic system 100 may be capable of operating in one of a plurality of modes of operation. As illustrative examples, one mode of operation may enable a graphics controller 141 of graphics subsystem 140 to perform operations based on graphics information from operands only contained in a dedicated local memory of graphics subsystem 140.

For another mode of operation, referred to as "Direct Memory Execute" (DIME) mode, graphics controller 141 of graphics subsystem 140 is capable of directly operating on at least texture maps as well as other types of graphics information (e.g., commands, color values, stencils, patterns, fonts, pixel depth "alpha" values and the like) from memory subsystem 130. Without DIME, processor subsystem 120 would likely fetch graphics information (e.g., texture maps) from memory subsystem 130 and write these texture maps to a dedicated, local memory 142 of graphics subsystem 140. This produces unnecessary, redundant copies of the texture maps. With DIME, redundant copies of the texture maps are avoided.

For yet another mode of operation, referred to as "Direct Memory Execute and Local" (DIMEL) mode, graphics controller 141 combines the operations of the two preceding modes. Thus, graphics controller 141 is capable of retrieving frequently-used graphics information from dedicated local memory 142 and also retrieving less-frequently used graphics information from system memory 131 of memory subsystem 130 described below.

As shown in FIG. 1, processor subsystem 120 includes at least one processor 121 coupled to chipset 110 via a processor bus 122. The I/O subsystem 150 includes a plurality of I/O devices $151_1$–$151_m$ ("m" is a non-negative whole number) connected to chipset 110 via an I/O bus (e.g., a Peripheral Component Interconnect "PCI" bus) 152. The I/O devices $151_1$–$151_m$ may include any addressable device enhancing the functionality of electronic system 100. For example, if electronic system 100 is a general purpose computer, I/O devices $151_1$–$151_m$ would typically include an input device such as a keyboard and/or cursor control device (e.g., mouse, touchpad, track ball, joystick, etc.), a mass storage device such as magnetic and/or optical disk drive, or even a transceiver device such as a modem or a network card.

As shown in this embodiment, chipset 110 includes logic circuitry to control the routing of information between any of these subsystem 120, 130, 140 or 150. The logic circuitry may include an accelerated graphics port (AGP) interface logic 111, a memory controller (MC) 112 and an optional Graphics Translation Lookup Buffer (GTLB) 113. The AGP interface logic 111 routes access requests (e.g., read requests and/or write requests) to GTLB 113. GTLB 113 performs address translations if the access request is directed to an address within a pre-defined, cached address range supported by a Graphics Address Ramping Table (GART) located in system memory 131. This address translation may provide multiple, disjointed page addresses to MC 112 in order to access graphics information at non-contiguous address locations in system memory 131.

As also shown in this embodiment, system memory 131 includes volatile memory (e.g., dynamic random access memory "DRAM") having a dynamically-allocated area 132. This dynamically-allocated area 132 includes a number of graphics operands and is quickly accessible by graphics controller 141 of graphics subsystem 140 (described below) due to the presence of an address translation mechanism such as GART in system memory 131 and GTLB in chipset 110. As a result, graphics controller 141 and its software can interpret disjointed space in system memory 131 as contiguous space. This enables graphics controller 141 to access large data structures such as a texture map, Z-buffer or even a color buffer. It is contemplated that memory accesses from processor 121 or graphics controller 141 may not utilize address translation mechanisms such as GART in favor of pre-loaded page tables. It is further contemplated that system memory 131 may include non-volatile memory as an alternative to or in combination with its volatile memory.

As further shown in FIG. 1, graphics subsystem 140 includes graphics controller 141 and optimal dedicated, local memory 142 situated in close proximity to graphics controller 141. The graphics controller 141 includes a plurality of ports; namely, a first port which provides direct access to local memory 142 and a second port which provides access to system memory 131 via an Accelerated Graphics Port (AGP) bus 143 constructed in accordance with an AGP interface 144. Graphics controller 141 typically processes graphics information and outputs display information directly to a display device (not shown). By using both ports simultaneously, graphics controller 141 may realize an enhanced bandwidth as opposed to a lesser bandwidth when only local memory 142 is used.

The AGP interface 144 includes a data path 145 and a command path 146 to enable graphics controller 141 to achieve relatively high throughput, even with randomly located texture patterns stored in system memory 131. In one embodiment, data path 145 features thirty-two (32) multiplexed address/data lines to propagate graphics information. The command path 146 features a "sideband" bus including a plurality of sideband signal lines (e.g., eight (8) signal lines) to allow graphics controller 141 to issue new access requests simultaneously with the continuing movement of data from previous access requests on data path 145. These combined information paths follow well-known "split transaction" protocol where one or more requests may be issued after a preceding request but prior to receiving a response for that preceding request. Moreover, these information paths may be optimized to handle data transfer granularity of approximately 8 bytes instead of a normal 32 byte cache line.

In summary, AGP interface 144 enables graphics controller 141 to interface directly with system memory 131 through AGP interface unit 111, MC 112 and optionally GTLB 113, instead of through PCI bus 152. This provides a special high throughput path for graphics controller 141.

Figure 2:
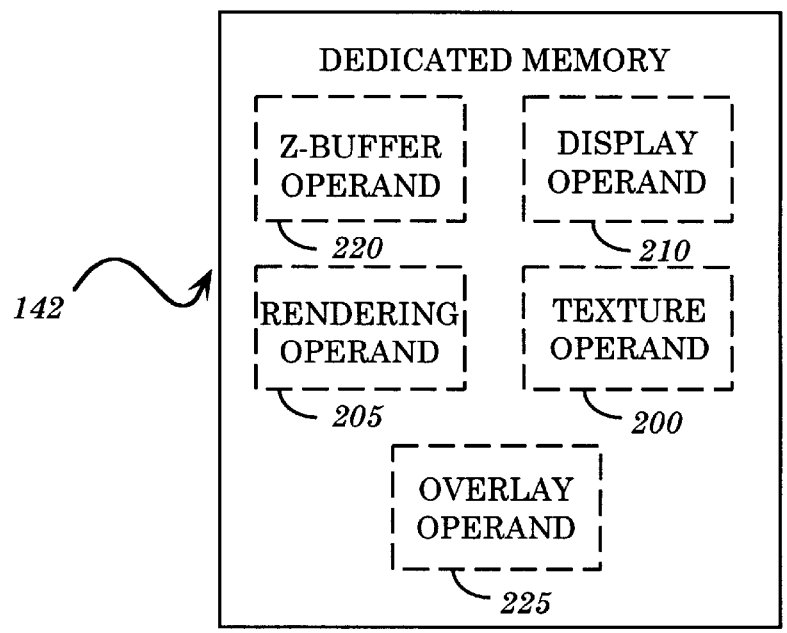
FIG. 2 is an illustrative embodiment of a graphics controller of the graphics subsystem that controls the access of information from either main memory or local frame buffer memory of the graphics subsystem operation through chipset.
Figure 2:
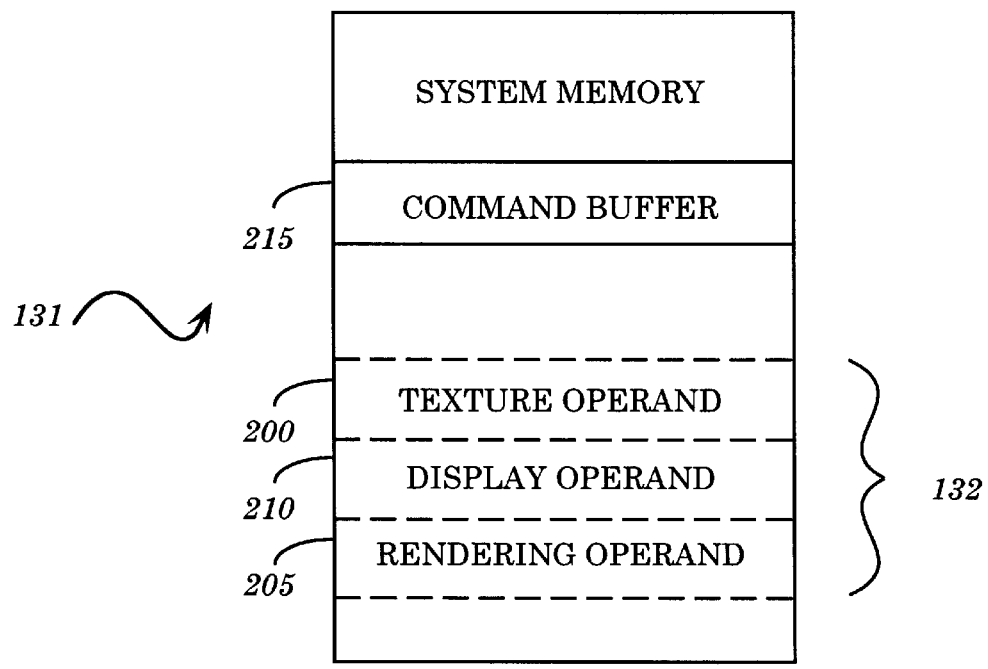

Referring now to FIG. 2, an embodiment of system memory 131 and local memory 142 is shown. A number of graphics operands may be alternatively located in either of these two memories. For example, the texture operand 200, that contains texture mapping information to provide surface texture of a 3D object, may be contained in system memory 131 or local memory 142. Likewise, the following graphics operands may be contained in either system memory 131 or perhaps local memory 142: a rendering operand 205 that contains data forming a newly created 3D object, a display operand 210 that contains data used for displaying the 3D object, a Z-buffer operand 220 that contains pixel depth "alpha" values for the 3D object, and an overlay operand 225 that is used to provide an alternative stream of graphics data instead of the data recovered from the display operand. The alternative nature of this implementation is represented by dashed lines and allows the memory size of local memory 142 to be drastically reduced. Such reduction is cost-effective because local memory 142 cannot be used for another purpose by an operating system of electronic system 100 when not being used for graphics. It is contemplated that other operands may be alternatively contained in system memory 131 or local memory 142 such as commands, color, stencils, patterns, fonts, alpha values and the like.

As further shown in FIG. 2, a command buffer 215 is included in system memory 131. In this embodiment, the command buffer 215 is a first-in, first-out (FIFO) ring buffer which stores a pointer to an array of commands from processor 121 of FIG. 1. A pointer is used by graphics controller to retrieve graphics information associated with the commands from dynamically-allocated area 132 of system memory 131.

Figure 3:
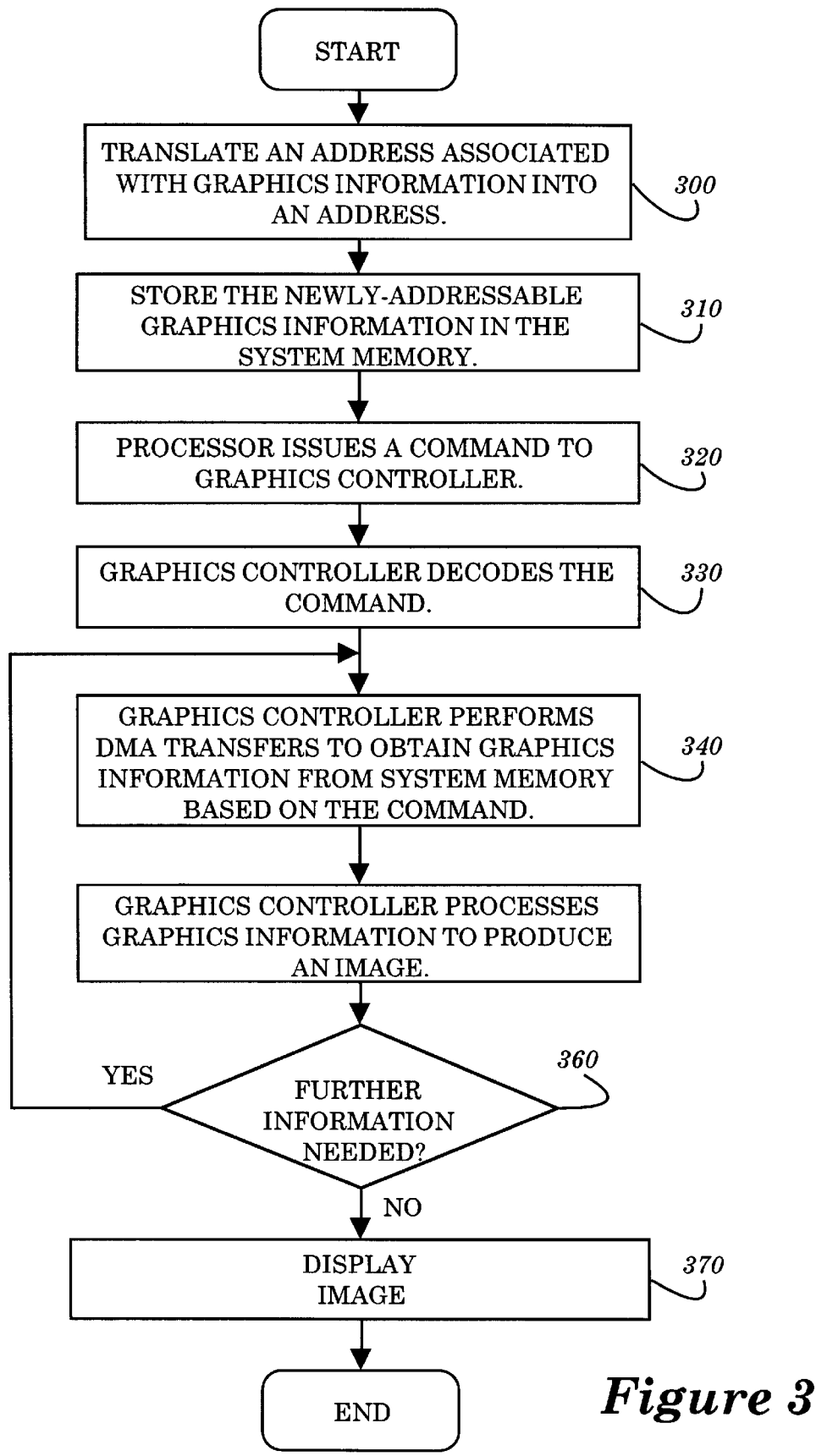
FIG. 3 is a flowchart illustrating the operational steps to be performed on one or more graphics operands placed in main memory.

Referring now to FIG. 3, an embodiment of the operations performed by the electronic system having certain operands contained in system memory is shown. In general, the processor will issue a command to access contents of an address within the pre-defined address range recognized by the GART. This address is translated to a physical address found in the dynamically-allocated area of the system memory. Graphics information is then stored in the system memory (blocks 300–310). Once a predetermined amount of graphics information has been written into the dynamically-allocated area, the processor will issue a subsequent command directly to the graphics controller to render an image for display (block 320). The graphics controller decodes the command (block 330) and begins obtaining graphics information associated with the subsequent command from system memory through one or more direct memory access (DMA) as set forth in block 340. For example, the graphics controller may obtain a pointer from the command buffer to access graphics information for a particular command.

Thereafter, the graphics controller 141 processes portions of a three-dimensional image to be displayed, normally in the form of triangles (block 350). During this processing stage, some texture requests are computed and transferred over the sideband bus to the AGP interface (block 360). These texture requests over the AGP interface may be reordered before transferring to the memory controller. Such reordering is accomplished to minimize the number of page crossings in order to increase system efficiency.

Arbitration may be necessary because the texture request may experience latency due to interfering traffic from the PCI bus or through processor reads and/or writes. The requested data returns to the chipset from system memory and is re-ordered in the same order that the requests were made for delivery over the AGP bus. Thereafter, the image is displayed (Step 370).

It is contemplated that Z-buffer requests may be interleaved with the texture requests or simply retrieved through local memory. However, rendering may occur on the local memory at any time and at a high speed. The display controller on the graphics controller controls priority for the display transfer and may temporarily preempt the transfer operations of the graphics controller to avoid accidentally displaying a black image on screen due to a lack of display data.

Although certain illustrative embodiments are described below in order to convey the spirit and scope of the present invention, such embodiments should not be construed as a limitation on the scope of the present invention. Rather, the specification and drawings should be regarded in an illustrative rather than a restrictive sense because the present invention may be configured with numerous modifications without departing from the broader spirit and scope of the invention as set forth in the appended claims.

What is claimed is:

1. An electronic system comprising:
   a chipset;
   a graphics bus;
   a graphics subsystem coupled to the chipset through the graphics bus; and
   a system memory coupled to the chipset, the system memory including an allocated memory location to store at least one graphics operand and a command buffer to store at least one pointer used by the graphics bus to retrieve the at least one graphics operand.

2. The electronic system of claim 1, wherein the graphics bus includes an Accelerated Graphics Port (AGP) bus.

3. The electronic system of claim 2, wherein the graphics subsystem includes (i) a graphics controller connected to the graphics bus via a first graphics port, and (ii) a dedicated memory connected to a second graphics port of the graphics controller.

4. The electronic system of claim 3, wherein the at least one graphics operand includes a texture operand.

5. The electronic system of claim 4, wherein the dedicated memory contains at least one of the texture operand, the rendering operand, the overlay operand and the display operand excluded from the memory element.

6. The electronic system of claim 3, wherein the at least one graphics operand includes a rendering operand.

7. The electronic system of claim 3, wherein the at least one graphics operand includes an overlay operand.

8. The electronic system of claim 3, wherein the at least one graphics operand includes a display operand.

9. The electronic system of claim 1, wherein the at least one graphics operand contains graphics information used to generate a three-dimensional object for display.

10. The electronic system of claim 1, further comprising a memory controller coupled between the chipset and the system memory.

11. An electronic system comprising:
    a chipset;
    a system memory coupled to the chipset, the system memory including an allocated area to store a graphics operand and a command buffer to store a pointer associated with the graphics operand;
    a graphics bus coupled to the chipset; and
    a graphics subsystem coupled to the graphics bus, the graphics subsystem including a graphics controller directly operating on the graphics operand retrieved from the system memory using the pointer from the command buffer to produce a three-dimensional object for display, the graphics operand including at least one of a texture map and an alpha blending value.

12. An electronic system comprising:
    a memory subsystem including a system memory containing at least one graphics operand and a command buffer to store a pointer associated with the at least one graphics operand; and
    a graphics subsystem including a graphic controller and a local memory coupled to the graphics controller, the graphics controller to retrieve the at least one graphics operand to produce a displayable image.

13. The electronic system of claim 12, wherein the at least one graphics operand includes a texture operand.

14. The electronic system of claim 13, wherein the at least one graphics operand includes a rendering operand.

15. The electronic system of claim 14, wherein the at least one graphics operand includes an overlay operand.

16. The electronic system of claim 15, wherein the at least one graphics operand includes a display operand.

17. The electronic system of claim 16, wherein each of the graphics operands are contained in a dynamically accessible portion of the system memory.

18. The electronic system of claim 12 further comprising a chipset coupled to both the graphics controller of the graphics subsystem and the system memory of the memory subsystem.

19. A method comprising:
    storing a graphics operand in an allocated area of a system memory;
    storing a pointer associated with the graphics operand in a command buffer of the system memory; and
    retrieving graphics information, including the graphics operand, from the system memory by a graphics controller controlling at least one direct memory access to the allocated area of the system memory using the pointer.

20. The method of claim 19, wherein prior to retrieving the graphics operand, the method further comprises
    issuing a read command from a general processor to the graphics controller; and decoding the read command by the graphics controller to obtain an address of the allocated area of the system memory from which the graphics operand may be obtained.

21. The method of claim 19 further comprising processing an image for display using the graphics operand; and obtaining additional graphics operands from the system memory over a sideband bus, being a command path of an Accelerated Graphics Port (AGP) bus, while the graphics information is being retrieved from the system memory over a data path of the AGP bus.

* * * * *